(12) United States Patent
Stern et al.

(10) Patent No.: US 7,548,926 B2
(45) Date of Patent: Jun. 16, 2009

(54) HIGH PERFORMANCE NAVIGATOR FOR PARSING INPUTS OF A MESSAGE

(75) Inventors: Aaron A. Stern, Bellevue, WA (US); Geary L. Eppley, Carnation, WA (US); Umesh Madan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 11/245,323

(22) Filed: Oct. 5, 2005

(65) Prior Publication Data

US 2007/0089115 A1  Apr. 19, 2007

(51) Int. Cl.
 *G06F 17/30* (2006.01)
(52) U.S. Cl. .................. 707/100; 707/101; 707/102
(58) Field of Classification Search .................. 707/100
 See application file for complete search history.

(56) References Cited

U.S. PATENT DOCUMENTS

| | | | | |
|---|---|---|---|---|
| 6,301,579 | B1 * | 10/2001 | Becker | 707/102 |
| 2003/0163285 | A1 | 8/2003 | Nakamura et al. | 702/179 |
| 2003/0200502 | A1 | 10/2003 | Abe et al. | 715/500 |
| 2004/0010752 | A1 | 1/2004 | Chan et al. | 715/513 |
| 2004/0060007 | A1 | 3/2004 | Gottlob et al. | 714/513 |
| 2004/0103105 | A1 * | 5/2004 | Lindblad et al. | 707/100 |
| 2004/0261019 | A1 | 12/2004 | Imamura et al. | 715/513 |
| 2005/0055334 | A1 | 3/2005 | Krishnamurthy | 707/2 |
| 2005/0055355 | A1 | 3/2005 | Murthy et al. | 707/100 |
| 2005/0187906 | A1 | 8/2005 | Madan et al. | 707/3 |
| 2005/0257201 | A1 | 11/2005 | Rose et al. | 717/136 |
| 2006/0020631 | A1 | 1/2006 | Cheong Wan et al. | 707/104.1 |
| 2007/0073734 | A1 * | 3/2007 | Doan et al. | 707/100 |
| 2007/0189159 | A1 * | 8/2007 | Gerdes et al. | 370/230 |

OTHER PUBLICATIONS

Goodrich, Michael; Tamassia, Roberto, Data Structures and Algorithms in Java, 2001, John Wiley and Sons, Inc. $2^{nd}$, Ed. pp. 69, 185, 187, 263-265.*

Reiman, Martin; Wright, Paul; Performance Analysis of Concurrent-Read Exclusive-Write, 1991, ACm Press, Proceedings of the 1991 ACM Sigmetrics conference on Measurement and modeling of computer systems, pp. 168-177.*

(Continued)

*Primary Examiner*—Yicun Wu
(74) *Attorney, Agent, or Firm*—Workman Nydegger

(57) ABSTRACT

Example embodiments provide a high performance navigator configured to lightly touch on the elements or input of a message, without necessarily having to build an entire tree structure for each input within the message. In addition, as portions of the inputs are identified as requiring further details, only those stub nodes representing that particular input will be created; thus avoiding the setup cost associated with loading an entire tree. Other example embodiments also provide for other optimizations such as reducing the class types of node allocations needed for navigating a particular message. For instance, a single class is defined that holds enough fields to store all of the information needed for numerous input nodes. Further, these common node structures can simultaneously generate as an array that further allows for more efficient navigation of the inputs.

15 Claims, 4 Drawing Sheets

OTHER PUBLICATIONS

Java API version 1.4.2, Interface Node, and Class Vector, 2003, http://java.sun.com/j2se/1.4.2/docs/api/http://java.sun.com/j2se/1.4.2/docs/api/org/w3c/dom/Node.html http://java.sun.com/j2se/1.4.2/docs/api/java/util/Vector.html.*

Java API version 1.4.2 Interface Document, 2003,http://java.sun.com/j2se/1.4.2/docs/api/org/w3c/dom/Document.html.*

W3C Document Object Model (DOM) Level 2 Core Specification, Nov. 2000, Version 1.0, http://www.w3.org/TR/2000/REC-DOM-Level-2-Core-20001113/DOM2-Core.pdf.*

Iguchi, et al., "*Schema Based Enhancement of XPath Engine,*" NCE Corporation, IEEE International Conference on Web Services, 2005, available at http://doi.ieeecomputersociety.org/10.1109/ICWS.2005.101 (PDF enclosed entitled "Article 1," 8 pages).

Gottlob, et al., "*Efficient Algorithms for Processing XPath Queries,*" VLDB Conference, 2002, available at http://www.ca.ust.hk/vldb2002/VLDB2002-proceedings/papers/S04P02.pdf (PDF enclosed entitled "Article 2," 12 pages).

Barton, et al., "*Streaming XPath Processing with Forward and Backward Axes,*" IBM Almaden Research Center, available at http://www.almaden.ibm.com/cs/people/fontoura/papers/icde2003.pdf (PDF enclosed entitled "Article 3," 12 pages).

Ives, et al., "*An XML Query Engine for Network-Bound Data,*" University of Washington, VLDB Journal, available at http://www.cis.upenn.edu/-zives/research/xmlengine.pdf (PDF enclosed entitled "Article 4," 29 pages).

* cited by examiner

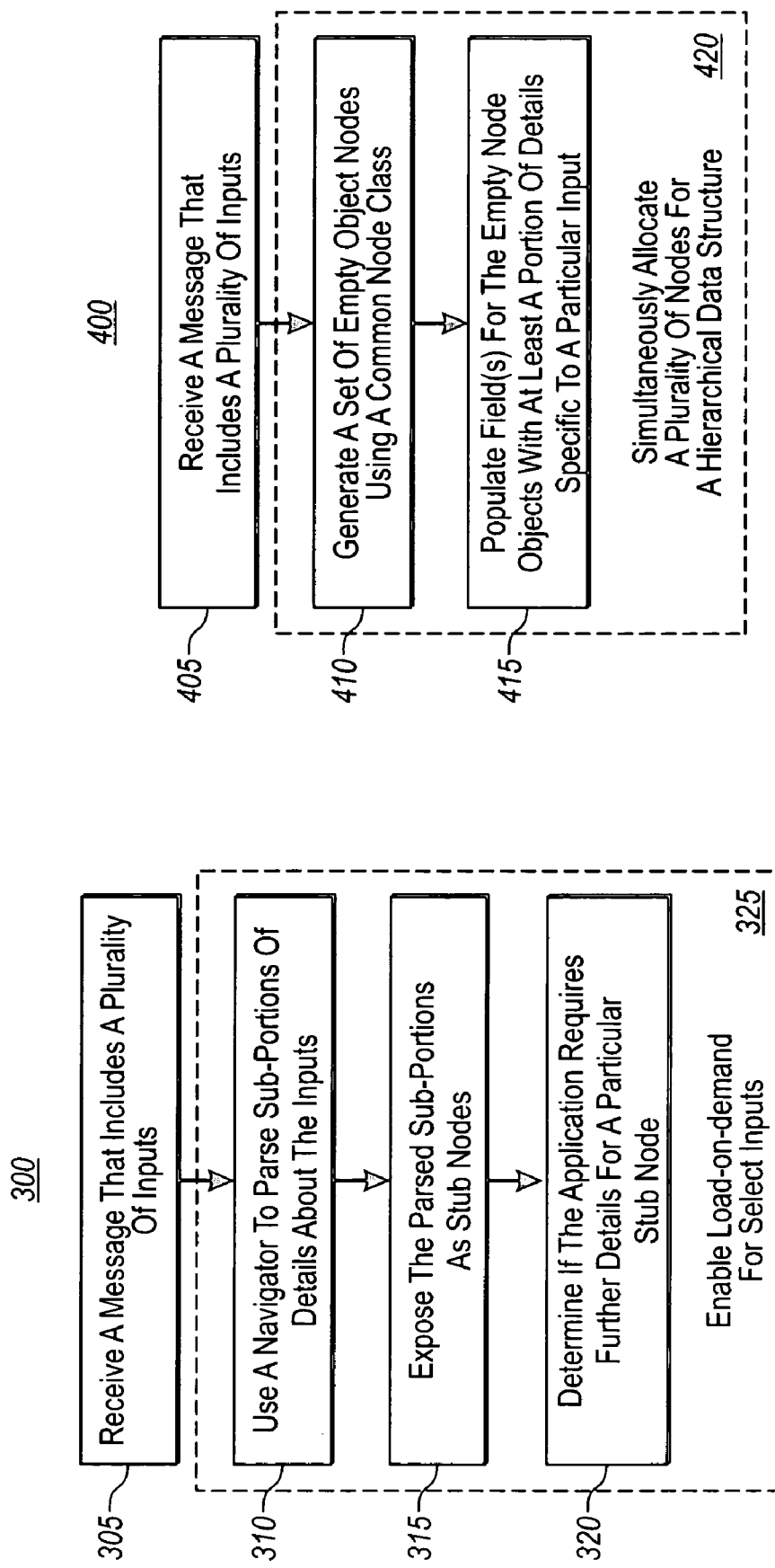

HIGH PERFORMANCE NAVIGATOR FOR PARSING INPUTS OF A MESSAGE

CROSS-REFERENCE TO RELATED APPLICATIONS

N/A

BACKGROUND

Although computers were once isolated and had minimal or little interaction with other computers, today's computers interact with a wide variety of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scale networks, and the wide-spread availability of low-cost personal computers, has fundamentally changed the way that many people work, interact, communicate, and play.

A relatively new and evolving communication protocol for sending messages between computing devices via the Internet is known as Simple Object Access Protocol, or SOAP. SOAP and other similar messaging protocols are based on the eXtensible Markup Language (XML), which is a language for structuring, storing, and sending data. Such messaging protocols provide a way to communicate between applications running on different operating systems, with different technologies and programming languages. Accordingly, these protocols are platform and language agnostic, yet simple and extensible.

In order to take advantage of these platform and language neutral protocols, interfaces are typically used for allowing programs and scripts running on the computing devices to dynamically access, process, and/or update the content, structure, and/or style of a message (e.g., a SOAP message). Such interfaces shield an application from the complexities associated with converting the document into content or inputs that can be understood by a particular application. For example, a Document Object Model (DOM) type interface can be used to parse the inputs of a message (e.g., an XML document) and expose them as a series of nodes in a hierarchical data or tree like structure. This data structure can then be stored in memory and repeatedly navigated for accessing and processing any part of the message by various applications.

Although such parsers allow for rich functionality and perform well for documents or messages that need to be randomly accessed and manipulated repeatedly, such navigation systems perform poorly in other situations. For example, each time a message is received, the interface requires that the entire content or inputs of the message be parsed and stored in memory. Accordingly, the runtime setup for these sophisticated input data structures requires large memory allocations. For an application which involves a one-time selective read/write per parse (i.e., an application that minimally accesses only a portion of the DOM and then discards it), these data structures present considerable overhead on memory and valuable processing resources. Such overhead can further be compounded for huge documents that require numerous node allocations for different node types, thereby requiring access to several different class libraries and requiring numerous memory addresses.

SUMMARY

The above-identified deficiencies and drawback of current message navigators are overcome through example embodiments of the present invention. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for increasing navigation performance by enabling a load-on-demand feature for only select message inputs in order to reduce runtime setup costs for applications that do not need detailed data structures. For example, a message is received that includes inputs that get exposed to an application as a hierarchical data structure. A navigator is then used to parse sub-portions of details about each of the inputs, which are then exposed as stub nodes in the hierarchical data structure such that the stub nodes represent the inputs. Based on the exposed sub-portions, it is then determined if the application requires further details for a particular stub node such that if further details are required, a complete branch of the hierarchical data structure is dynamically generated for exposing complete input details of the particular stub node.

Another example embodiment provides for efficiently creating the hierarchical data structure of message inputs by simultaneously allocating nodes using a common node structure such that each node allocated is designed to function for numerous different input types. For example, a message is received that includes different types of inputs. A set of empty node objects is then generated using a common node class that includes a standard set of fields for the different types of inputs. Thereafter, the fields for various empty node objects are populated with at least a portion of details specific to a particular input of the message in order to expose different types of inputs for the message as nodes in a hierarchical data structure that can be used by an application in evaluating the message.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flow diagram of a method increasing navigation performance by enabling a load-on-demand feature in accordance with example embodiments; and FIG. 4 illustrates a flow diagram of a method of creating a hierarchical data structure by simultaneously allocating nodes using a common node structure in accordance with example embodiments.

DETAILED DESCRIPTION

Figure 1A:
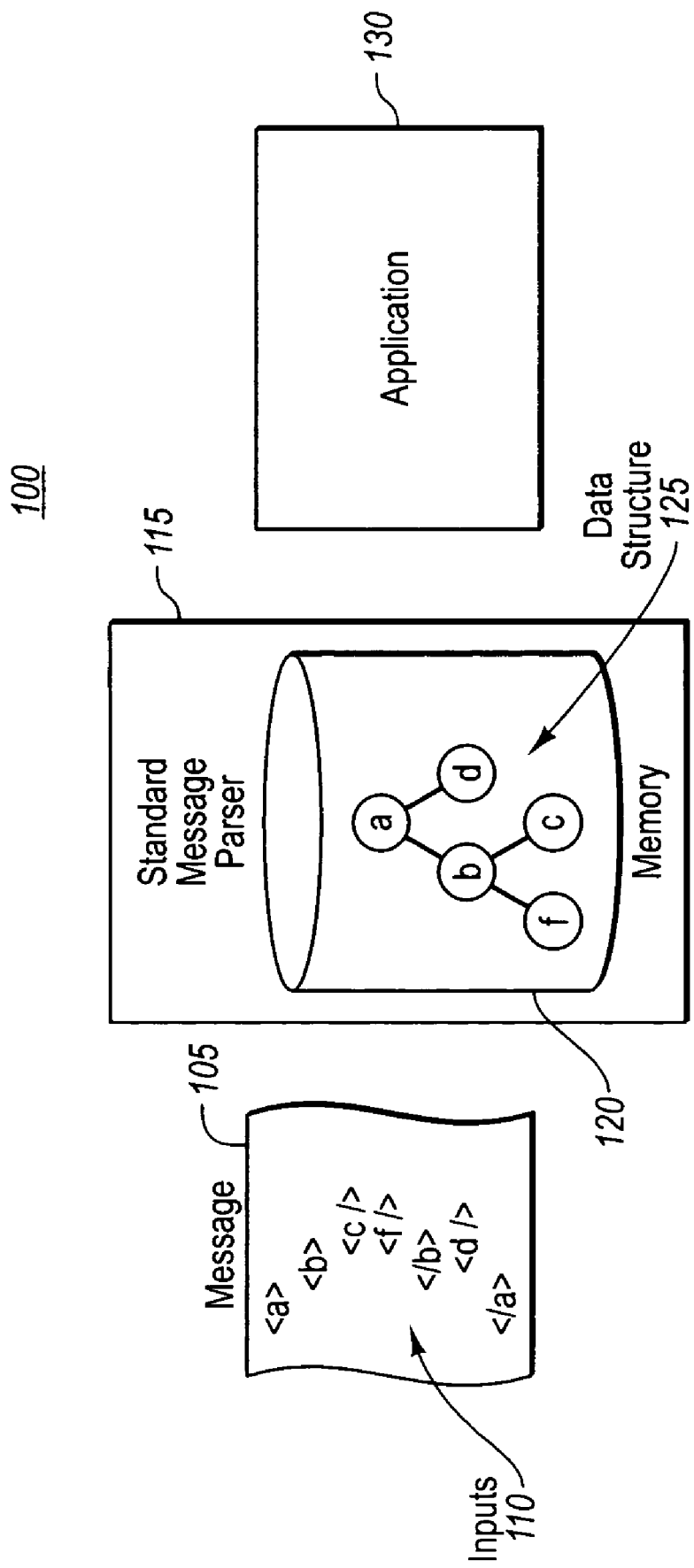
FIG. 1A illustrates a computing system with a standard message parser that exposes inputs of a message as a complete tree structure.

The present invention extends to methods, systems, and computer program products for optimizing the performance of a message navigation system used in parsing inputs of a message. The embodiments of the present invention may comprise a special purpose or general-purpose computer including various computer hardware or modules, as discussed in greater detail below.

Example embodiments, as described herein, provide a high performance and flexible navigator that is optimized to reduce setup costs associated with creating a message data structure (e.g., a DOM). As previously mentioned when messages (such as an XML document, e.g., SOAP message, HTML document, etc.) are to be processed by an application, a parser may be used to interpret the contents or inputs for the application. Thus, the parser shields the application from the conversion details for the inputs, which allows for enhanced performance and ease in development of many applications. A standard type of message parser iterates over the inputs or contents of a message and creates a detailed data structure for all of the inputs within a message. Such detailed data structures require large allocations of memory and processing resources during runtime setup. For applications that minimally access portions of a data structure that are then thrown out, these data structures present considerable overhead on memory and processing resources, especially for large documents that require enormous allocations.

Example embodiments provide an optimized navigator with noticeable performance gains over current parses by enabling load-on-demand functionality that postpones loading fragments of message inputs into a data structure until they are traversed into. For instance, full inputs (such as header blocks and body contents) are not loaded into the data structure (e.g., DOM) until the first time the navigator descends into them. Instead, example embodiments provide for loading only sub-portions of the details of an input, e.g., local name, as stub nodes in the data structure, which can then be exposed to an application. The stub nodes expose sufficient information within a construction of essentially an empty element node, which represents an entire input to the client or application. Nevertheless, if it is determined that more detail for a specific input is to be traversed (e.g., element attributes, namespaces, children, etc.), the entire branch for that input will be dynamically generated using the full details.

Other example embodiments further (or by themselves) optimize the setup costs associated with constructing a hierarchical data structure by allowing for simultaneous allocation of numerous empty nodes, regardless of the type of input the node will hold details for. As is known, allocations are inherently expensive since the central processor has to do memory management surrounding them. Accordingly, one embodiment herein provides for defining a common node structure that functions for a plurality of different input types. The common node structure includes a standard set of fields designed to function for a plurality of different node or input types.

For instance, if the application is an inverse query engine (e.g., XPath engine) a common node structure may include empty or unpopulated fields configured to hold details for inputs that correspond to a root node, element node, attribute node, namespace node, processing instruction node, comment node, text node, etc. Accordingly, rather than having numerous different classes that need to be allocated and created when building up a data structure, example embodiments provide for one class that holds enough fields to store all of the information needed for numerous input nodes of a hierarchical data structure. Accordingly, any number of empty nodes can be simultaneously allocated and the appropriate fields configured or populated with details about the specific inputs as they are navigated or traversed into. In addition, other nodes can be dynamically allocated and added to the data structure as needed. This feature provides for a tremendous performance benefit when it is possible to allocate a plurality of nodes (via an array or other process) faster than the traditional allocation of each node individually.

In yet another example embodiment, nodes for a data structure are configured or allocated as an array with pointers that can be used to navigate to related nodes. For instance, the expandable nodes allocated using the common node structure may be configured as an array of common nodes that can then be populated with specific input details. The nodes are also referenced using unique indices or pointers for navigating the array, as opposed to other systems that require allocations or more complicated data structures for navigation purposes. For example, the nodes can include indices for all related nodes (e.g., child, parent, sibling, descendant, etc.), which allows for a more efficient way to save and restore the current location without necessarily a need for saving state when traversing into various branches of the data structure.

Although more specific reference to advantageous features are described in greater detail below with regards to the Figures, embodiments within the scope of the a present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1A illustrates a computer system 100 that uses a standard message parser 115 for building a tree like data structure for exposing inputs to an application. As shown, a message 105 may be received with various inputs 110. Based on their hierarchical relationship, all of the inputs 110 for a message are parsed using standard message parser 115 and stored in memory 120 as a tree like data structure 125, which can then be exposed to application 130. Each node within the data structure 125 includes full details about the particular input, which may or may not be utilized by the application 130. Accordingly, the runtime setup for such data structures 125 are inherently expensive and can waste valuable memory and processing resources.

Figure 1B:
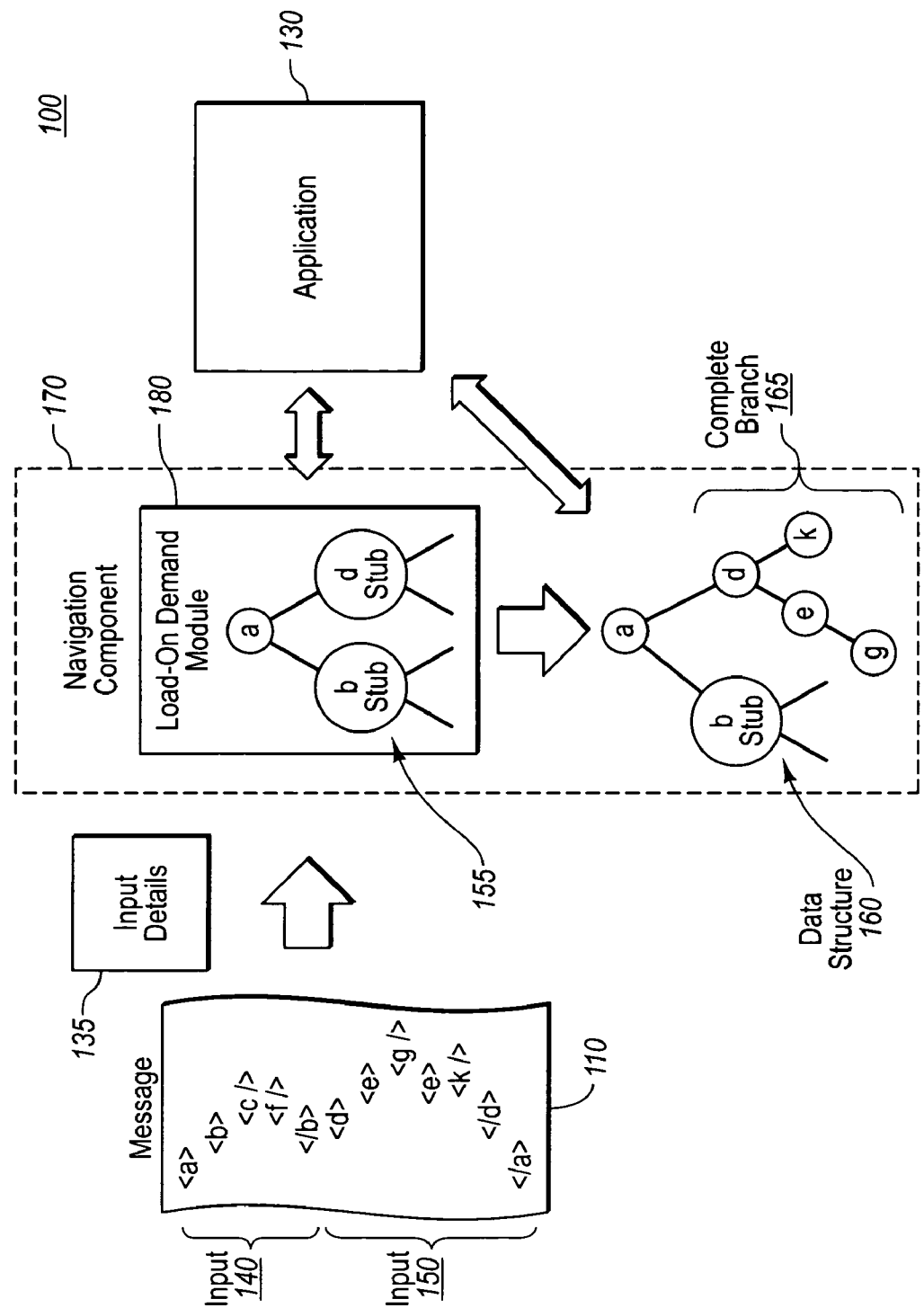
FIG. 1B illustrates a navigation module configured to expose inputs for a message using stub nodes in accordance with example embodiments.

Example embodiments of the present invention optimize standard message parsers 115 by providing a navigator configured to reduce node allocation costs and enable a load-on-demand feature that only loads fragments of inputs into the data structures exposed to a message in order to delay loading the details about particular inputs until needed. FIG. 1B illustrates a computing system 100 that has been optimized with a navigation component 170 in accordance with example embodiments. Message 110 may be received that has various inputs (e.g., input 140, and input 150).

Note that the inputs 140, 150 may also include other inputs embedded therein. For example, these inputs 140, 150 may correspond to headers blocks or body parts of a message, which can further include various elements with various attributes, values, children, and other inputs within them. Embodiments described herein, however, are not limited to any particular type of input and can be used for optimizing the evaluation of many different input types. Moreover, the term "input" as described herein should be broadly construed to include principle inputs, as well as any sub-inputs therein. Nevertheless, as will be described in greater detail below, the details of the inputs below the principle inputs (e.g., inputs 140, 150) will typically be shielded from the application 130 until the principle inputs are traversed. Further note, that although the inputs herein are represented as simple characters, e.g., "<a>",:"<b>", etc., typical inputs are of a more complex form such as in well known in SOAP (and other XML formats), HTML, and other messaging protocols.

Regardless of the type of input, number of sub-inputs, or contents defined therein, the input details 135 are extracted from the message 110 using the navigation component 170. These input details 135 will typically describe the full set of inputs 140, 150 and include all the information and processing content from the message 110. Note, however, that input details 135 do not necessarily need to include all information within the message 110. For example, irrelevant or other unneeded information (e.g., the envelope header or other tags), may be excluded from the input details 135. Accordingly, any specific reference to what the input details 135 include is used herein for illustrative purposes only and is not meant to limit or otherwise narrow the scope of embodiments described herein.

In any event, navigation component 170 uses the input details 135 to construct a hierarchical data structure 155 as a series of stub nodes. More specifically, sub-portions of the input details 135 are extracted and exposed to the application 130 as stub nodes (e.g., "b stub" and "d stub") in data structure 135. Note that the sub-portion of the details 135 are not limited to any specific type of data for the inputs 140, 150; however, the stub nodes should include sufficient information to provide a construction of essentially an empty element node that adequately represents the inputs 140, 150 to the application 130. For example, the sub-portion of the details 135 within the stubs may include node type, local name, namespace, qualified name, etc. of the input details 135, as well as a marker or reference for building an entire data structure branch for the complete input details 135. This data structure of stub nodes 155 may then be exposed to the application within load-on-demand module 180, which is configured to expand or load the full input data structure or sub-portions thereof as necessary. Nevertheless, the stub nodes appear to the application as if they have the other elements therein already hanging off of them.

For example, load-on-demand module 180 may expose the hierarchical data structure 155 to application 130. Based on the sub-portion of the input details 135, it may be determined that the application needs further details 135 about the "d stub". Accordingly, the load-on-demand module 180 generates the complete branch 165 of the corresponding information for the input 150, which is then exposed as data structure 160 to the application 130 for further processing. Although, the dynamic creation of the complete branch 165 creates a small delay when the application 130 goes to traverse the particular input (e.g., input 150 in this example), such delay is small in comparison to the setup time needed to create an entire tree of all possible inputs within the message 110.

In accordance with another embodiment, the expanded data structure 160, as well as other data structures evaluated 155, may be cached for use by other similar applications 130. Typically, however, once the application 130 has processed the desired portions of the message 110, the data structures 155, 160 will be discarded to free up the in memory allocations created.

Note that although the data structures 155, 160 include the root node "a", this node may or may not be within the initially constructed (and other) data structures that include the stub nodes. Nevertheless, the node is included in this example for ease in understanding the underlying concepts. In addition, note that the terms "hierarchical data structure", "tree like data structure", "tree", and similar references to a "data structure" are used herein interchangeably. Accordingly, any inclusions of a particular node, as well as any specific form of data structure used for embodiments herein, are for illustrative purposes only and are not meant to limit or otherwise narrow the scope of embodiments described herein.

Also note that the above load-on-demand feature and other embodiments as described herein are particularly useful in filter engines containing queries that are used to analyze messages that are sent and/or received by the system and to determine if and how the messages will be processed further. A filter engine may also be called an "inverse query engine." Unlike a database, wherein an input query is tried against a collection of data records, an inverse query engine tries an input against a collection of queries. Each query includes one or more conditions, criteria, or rules that must be satisfied by an input for the query to evaluate to true against the input. In one embodiment, the queries are XPath queries, which define a functional language for representing queries that are often evaluated against XML documents.

Other embodiments provide for protecting certain portions of the data structures 155, 160 from being traversed. For example, if the input 140, 150 for a message 110 is a body element, the navigator 170 may keep track of where in its data structure 155, 160 the body element is located. Exemplary embodiments support a mode that will cause the navigator 170 to throw an exception if the navigator 170 is directed to read the details 135 from the body. This allows the navigation of messages 110 with streamed bodies without consuming the stream. Of course, embodiments herein contemplate that other portions of the inputs can be flagged with other exceptions as needed. Accordingly, the use of the body exception is just one example of exception throwing and is described herein for illustrative purposes only and is not meant to limit or otherwise narrow the scope of example embodiments described herein.

As previously eluded to, the navigator 170 may not have a sanity check for the message inputs 210. Accordingly, if the sub-portion of the details exposed has different information (e.g., local name, namespace, and prefix) than expected, the navigator 170 may ignore them and continue to use the sub-portion of the details it originally extracted from the inputs. Also, as previously mentioned, if inputs 140, 150 have any inputs or elements following them (e.g., a header element with attributes, values, child elements, etc.), they may be ignored. For example, if a security header exposes as XML two sibling security headers, only a portion of the first security header may be loaded as the stub node.

Other example embodiments provide for read-only data structures (e.g., 155, 160). As such, the navigation component 170 may only need to lock (i.e., ensure that other threads are not using the data structure) when a portion of the data structure 160 is being loaded (e.g., construction of complete branch 165). Once a portion 165 of the hierarchical data structure 160 is constructed, multiple threads can navigate over it without having it changed out from under them. Having such a thread safe data structures 155, 160 allows for such things as cloning a navigator 170 by copying the original navigator's 170's location and sharing its data structure 155, 160. Accordingly, no matter how many clones separate them, any two instances of the navigator 170 related by cloning will share the same data structure 155, 160. Note, however, that the navigator 170 does not necessarily need to include thread safety features; and therefore the use of the read-only feature is for illustrative purposes only and is not meant to limit or otherwise narrow the scope of embodiments described herein.

As previously mentioned, another way to increase performance of the navigation module 170 is to reduce the types of allocations needed for each input. The numerous allocations needed for current parsing interfaces are a large performance hit, particularly if the full data structures 120 have a short lifetime. Example embodiments, however, solve some of the above-identified deficiencies of current allocation mechanisms by allocating nodes in a data structure 125 using a common node structure.

Figure 2:
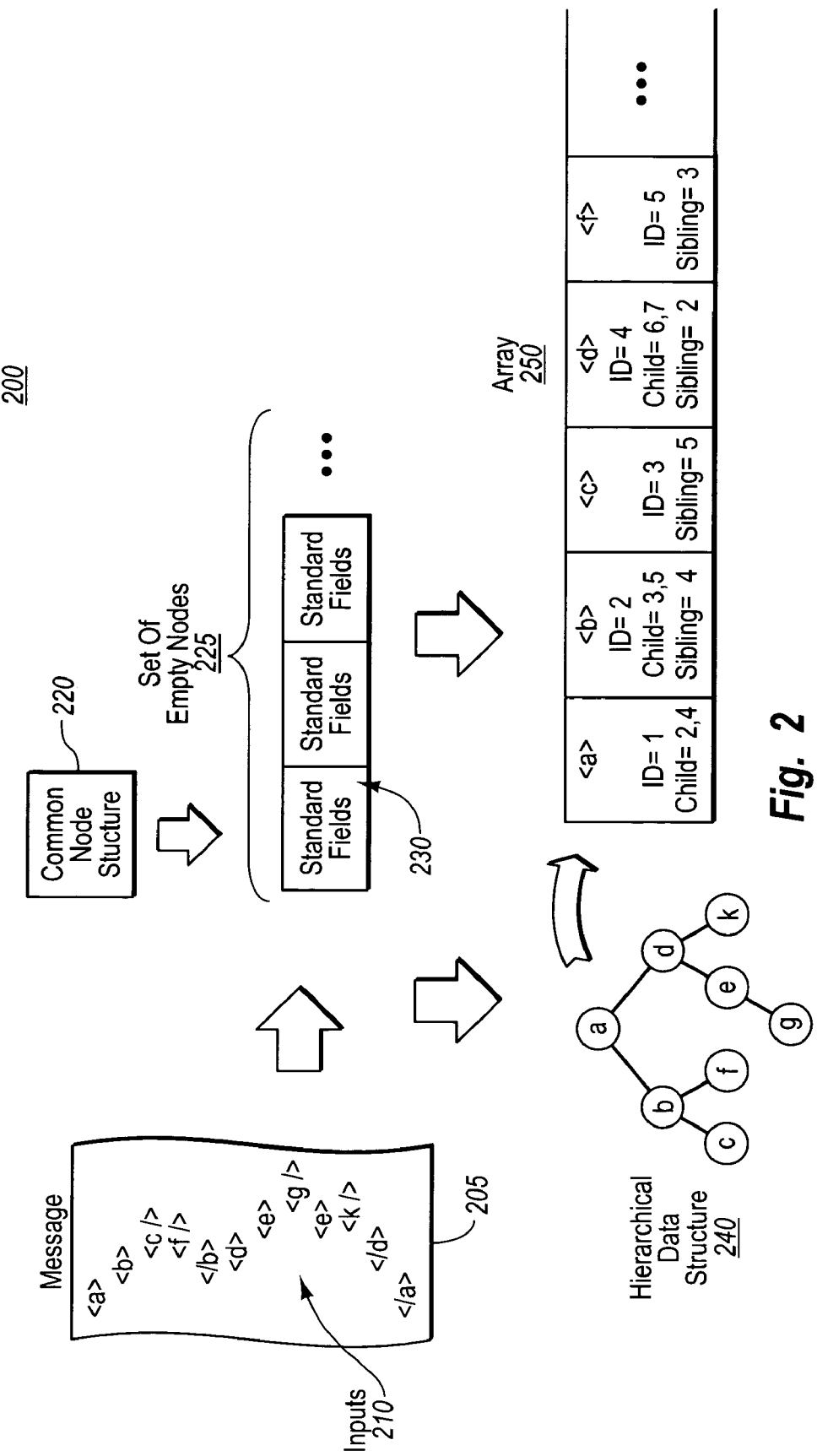
FIG. 2 illustrates an array and hierarchical data structure created using a common node structure in accordance with example embodiments.

FIG. 2 illustrates how this common node structure 220 may be used to reduce setup time associated with constructing hierarchical data structures, e.g., 155, 160, 240. As shown, a computer system 200 (e.g., navigation component 170, XPath engine, etc.) is provided that receives a message 205 that includes numerous inputs 210 of various types. Rather than using different classes for the different types of inputs, a common node structure 220 is used in allocating a set of empty nodes 225. Note that any number of nodes 225 may be allocated and expanded as needed. For example, the empty node set 225 may start out as a random or predetermined number, which can then be increased by some factor (e.g., a factor of two) as needed. This factor should allow for the increase in node 225 allocation while ensuring that the count does not increase too rapidly, which would waste valuable memory resources.

In any event, as previously mentioned, the set of empty nodes 225 are created using common node structure 220, which includes a standard set of fields 230 for a plurality of different input types. The common node structure 220 should include fields 230 sufficient to represent any number of nodes for the various input types. For example, in the case of an XML document to be evaluated against XPath expressions, the common node structure 220 may include empty or unpopulated fields 230 that define details for inputs corresponding to a root node, element node, attribute node, namespace node, processing instruction node, comment node, text node, etc. Accordingly, rather than having numerous different structures that need to be allocated and created when building up a data structure, example embodiments provide for one class 220 that holds enough fields 230 to store all of the details needed for numerous types of inputs.

Note that although the above example of standard fields 230 provided a list of possible nodes corresponding to a set of particular input types (i.e., Xpath), the present invention is not limited to any specific standard fields 230 for any specific input types. In fact, the standard fields 230 are extensible such that as new fields are needed, they may be added to without breaking other components. Accordingly, the use of the XPath node sets for defining the standard fields 230 is for illustrative purposes only and is not meant to limit or otherwise narrow the scope of embodiments described herein unless explicitly claimed.

Regardless of the types of inputs 210 or nodes that define the standard fields 230, after the set of empty nodes 225 is created, each empty node can then be populated with the appropriate input details from the inputs 210. Accordingly, the use of the common node structure 220 reduces setup time since numerous class libraries for the different types of nodes will not need to be accessed. In addition, because the common node structure 220 is used for all type of nodes, nodes can be simultaneously allocated for thus further saving setup time. More particularly, there is a performance benefit with this embodiment when it is possible to allocate a plurality of nodes (via array or other process) faster than allocating each node individually.

Note that this particular embodiment of using the common node structure 220 to generate node sets is not limited to the load-on-demand feature previously described. In fact, this particular embodiment can be used to generate an entire hierarchical data structure 240 that includes the details for all of the inputs. Nevertheless, the load-on-demand feature described above can also be enhanced through this and other exemplary node allocation described herein. In such case, note that a reduced set of standard fields may be used, since the stub nodes only hold a reduced amount of data or details about the inputs 210. For example, the common node structure 220 may only include standard fields 230 for the sub-portion of details needed, e.g., type of node, local name, namespace, Qname, etc. Nevertheless, the stub nodes can also include fields 230 for all the necessary details of a particular input 210, even though several of the fields may not be populated unless the input is traversed. Note, however, that the used of the common node structure 220 for the full set of standard fields 230 allows for the population of the fields 230 when it is determined that additional details of the inputs 210 are needed.

Regardless of the size of the fields 230 or details that define a specific node type, the populated nodes can be formed to represent hierarchical data structure 240. Other example embodiments, however, provide for exposing the data structure as an array 250 rather than a tree like structure. In this embodiment, each node within the array includes a unique identifier (ID) that can be used and referenced by related nodes. As will be appreciated, the use of the array 250 has several advantageous features. For example, used in conjunction with the common node structure 220, any number of nodes can be allocated, expanded, reduced, or modified as needed. In addition, because unique identifiers are used as pointers to related nodes (e.g., child, parent, sibling, descendant, etc.), nodes may be efficiently navigated without necessarily requiring saving state when traversing into various branches of the data structure and/or moving from node to node. All that may need to be saved is the index of the node from where the pointer moved to and the current index. In fact, each node may have information sufficient for allowing the pointer to move or navigate without the need for storing indexes, if the data structures are well defined.

Note also, the configuration allows for the distribution of inputs and even sub-portions of inputs across numerous node allocations. For example, an element with a large attribute may be distributed across several different node allocations. Note that in such instance, each node may only need to reference the next (if any) portion of the attribute since the portions will need to be evaluated in the order in which they were defined. Each portion of the attribute, however, does not necessarily need to reference the previous portion, but the different portions should probably at least reference their parent element. Of course, this distribution of inputs or sub-portions of inputs across numerous node allocations is not limited to attributes. For example, such embodiment may apply to other nodes, such as text nodes or any other node that can be broken up into multiple sequential nodes for easier processing. Accordingly, the use of any particular type of input for distribution across multiple node allocations is for illustrative purposes only and is not meant to limit or otherwise narrow the scope of embodiments herein described.

FIG. 2 illustrates an example of an array 250 for a portion of the hierarchical data structure 240. Note that the nodes in the array 250 may appear in any order, since they are uniquely identified. In other words, the unique IDs are keys that allow for random access of a data structure. In other words, there isn't a need to search for what an ID maps to, the IDs or indices have the information necessary to indicate where they are stored. For example, initially note that the IDs for the nodes correspond to its placement within the array 250, although this need not be the case. In any event, node <f> ID=5 appears after node <d> ID=4. As shown in node <f> (and in the hierarchical data structure 240), <f> has a sibling node with ID=3, which corresponds to node <c>. Note, however, that <d> with ID=4 has a sibling for node ID=2, corresponding to node <b> with child elements <c> and <f>, IDs=3 and 5. Because node <d> (sibling node to <b>) appears between child nodes <c> and <f> in the index, node <d> may appear out of order. Nevertheless, because these arrays 250 include unique identifiers and index the related nodes, the ordering of the nodes may not matter.

Note that other random access data structures other than arrays 250 are also available to embodiments herein described. For example, hash tables and other random access data structures can be used for example embodiments herein described. Accordingly, the above use of an array 250 as a random access data structure is used for illustrative purposes only and is not meant to limit or otherwise narrow embodiments herein described unless explicitly claimed.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIGS. 3 and 4—is used to indicate the desired specific use of such terms.

As previously mentioned, FIGS. 3 and 4 illustrate flow diagrams for various exemplary embodiments of the present invention. The following description of FIGS. 3 and 4 will occasionally refer to corresponding elements from FIGS. 1A, 1B, and 2. Although reference may be made to a specific element from these Figures, such elements are used for illustrative purposes only and are not meant to limit or otherwise narrow the scope of the described embodiments unless explicitly claimed.

FIG. 3 illustrates a flow diagram for a method 300 of increasing message navigation performance. Method 300 includes an act of receiving 305 a message that includes a plurality of inputs. For example, the navigation component 170 may receive a message 110 within inputs 140, 150, which get exposed to an application as a hierarchical data structure 155, 160, 250. The application may be an XPath engine and the message 205 may be an XML document.

Method 300 also includes a step for enabling 325 load-on-demand for select inputs. More specifically, step for 325 includes an act of using 310 a navigator to parse sub-portions of details about the inputs. For example, navigator 170 may be used to parse sub-portions of the input details 135 about each input 140, 150 within message 110. Step for 325 also includes an act of exposing 315 the parsed sub-portions as stub nodes. For example, navigation component 170 can be used to expose stub nodes (e.g., "stub b" and "stub d") in the hierarchical data structure 160, wherein each stub node represents one of the inputs 140, 150 to application 130. Note that the sub-portion of the input details 135 may include a type of node, local name, namespace, or Qname. Further, the input(s) may include a header, a body part, or both, and the sub-portion of the details 135 exposed from the portion of the header, the body part, or both, may also include a local name, namespace, or both. Note that the inputs themselves may have other inputs (e.g., an element input with attributes, text, child, etc. inputs) within them that do not get exposed to the application until it is determined that they are needed.

Based on the exposed sub-portions, step for 325 further includes an act of determining 320 if the application requires further details for a particular stub node. For example, navigation component 170 includes a load-on-demand module 180 that can be used for determining if application 130 requires more details from a particular stub node (e.g., "stub d"). If further details 135 are required, load-on-demand module 180 may dynamically generate a complete branch 165 for exposing complete input details 135 of the particular stub node. Note that the hierarchical data structure may be a Document Object Model (DOM).

Embodiments provide that the hierarchical data structure 155, 160 is read-only in order to eliminate the need for locks on multiple concurrent running instances or threads of the hierarchical data structure. If the complete branch 165 of the data structure 160 is required to be dynamically generated, the navigator 170 may take a lock on the hierarchical data structure 160 during the generation of the branch 165 in order to make the hierarchical data structure 160 thread safe.

Note that the hierarchical data structures 120, 155, 160, 240 (or a portion thereof) may be an array 250 and each populated node includes at least information about a type of input it represents, its own index reference, and indices for referencing other related nodes within the array 250. The indices for referencing other related nodes within the array may be indices for referencing a child node, at least a portion of an attribute node, sibling node, parent node, descendent node, etc.

FIG. 4 illustrates a flow diagram for a method 400 of efficiently creating a hierarchical data structure of message inputs. Method 400 includes an act of receiving 405 a message that includes a plurality of different types of inputs. For example, the computing device 200 may receive a message 205 with different types of inputs 210. The computing device 200 may be a computing device for an inverse query engine (e.g., an XPath engine) and the message 205 may be an XML document.

Method 400 also includes a step for 420 simultaneously allocating a plurality of nodes for a hierarchical data structure. Further, step for 420 includes an act of generating 410 a set of empty node objects using a common node structure. For example, a set of empty node objects 225 may be generated using a common node structure 220 that includes a standard set of fields 230 for a plurality of different types of inputs. Note that the set of empty nodes 225 may be simultaneously allocated in the form of an array 250 configured to be expandable as necessary. As such, if additional object nodes 225 are needed for the inputs 210 additional empty node objects 225 can be added to the array 250 by some factor of the original allocation (e.g., a factor of two).

Step for 420 also includes an act of populating 415 the field(s) for the empty node objects with at least a portion of details specific to a particular input. For example, the fields 230 for empty nodes 225 may be populated with at least a portion of input details 135 specific to a particular input 210 of the message 205 in order to expose the different types of inputs 210 as nodes in a hierarchical data structure 240, 250 that can be used by an application 130 in evaluating the message 205.

If the data structure is an array 250, each node may include information about a type of node it represents, its own index reference, and one or more indices (e.g., IDs) for referencing other related nodes within the array 250, without necessarily the need for saving state for navigating portions of the data structure 250. The one or more indices for referencing other related nodes within the array 250 may be indices for referencing at least a portion of one or more of a child node, an attribute node, a sibling node, a parent node, a descendent node, etc. Further, the information about the type of input 210 may also be a local name, namespace, or both. In addition, in the case that the navigator 170 is an XPath navigator, the application is an XPath engine, and the message 205 is an XML documents, the specific input types may be a root node, element node, attribute node, namespace node, processing instruction node, comment node, and/or text node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a message navigator that exposes inputs of a message as branches of a hierarchical data structure, a method of increasing navigation performance by enabling a load-on-demand feature that creates complete branches for only select inputs in order to reduce runtime setup costs for applications that do not need detailed branches for each input within the message, the method implemented by a computer comprising a processor and a memory, the method comprising:

receiving a message that includes a plurality of inputs that get exposed to an application as a hierarchical data structure, which represents each of the plurality of inputs as nodes therein;

as part of an initial processing of the message when creating the hierarchical data structure, using a navigator to parse sub-portions of details about each of the plurality of inputs, wherein the navigator extracts portions of input details for each of the plurality of inputs in determining if such details can be delayed for later, dynamic processing by the application;

based on details for the plurality of inputs in the message, generating the hierarchical data structure which comprises, a first of the parsed sub-portions represented as a node with complete input details about a first input of the plurality of inputs, and a second of the parsed sub-portions represented as a stub node that includes partial input information sufficient to represent a second input of the message such that the stub node appears to the application as if it had all elements for the second input already as part of the hierarchical data structure, but wherein the stub node does not include complete input details for the second input in the message such that full processing of the second input is delayed until a later request by the application in order to save setup time in generating the hierarchical data structure;

after the initial processing of the message receiving a request from the application, which requires further input details associated with the stub node representing the complete input details for the second input; and based on the request dynamically generating and loading the complete input details of the second input using the partial input information within the stub node such that the complete input details of at least one input are exposed to the application for further processing.

2. The method of claim 1, wherein the stub nodes represents a plurality of different types of inputs, and wherein the hierarchical data structure is dynamically created by a method comprising:

generating a set of empty node structures using a common node structure that includes a standard set of fields for the plurality of different types of inputs; and upon receiving the request from the application, populating one or more of the fields for the plurality of the empty node objects with the parsed sub-portion of details about the second inputs in order to dynamically create the stub nodes in the hierarchical data structure and expose it to the application prior to the dynamic generating and loading of the complete input details when evaluating the message.

3. The method of claim 2, wherein the hierarchical data structure is represented by an array and the stub nodes includes populated fields corresponding to an input type, local name, and namespace.

4. The method of claim 2, wherein upon receiving the request from the application, a complete branch that includes one or more of the plurality of different types of inputs is needed for the complete input details of the second node, and wherein the complete branch is dynamically created by a method comprising:

generating a second set of empty node objects using the common node structure that includes the standard set of fields for the plurality of different types of inputs; and populating one or more of the fields for a plurality of the second set of empty node objects with details about each of nodes within the complete branch in order to expose each branch node to the application when evaluating the message.

5. The method of claim 1, wherein the parsed sub-portions exposed include a local name, namespace, or both for the corresponding input.

6. The method of claim 1, wherein the plurality of inputs for the message include a header, a body part, or both, and wherein the sub-portion of details exposed from the portion of the header, the body part, or both, include a local name, namespace, or both.

7. The method of claim 6, wherein the header is an element that includes one or more attributes, child elements, or both, and wherein based on the need to further evaluate the one or more attributes, child elements, or both, it is determined that the complete branch of the hierarchical data structures is to be dynamically generated for further evaluation of the header element.

8. The method of claim 6, wherein at least one of the plurality of inputs is the body part in the form of a body stream, and wherein the application is prohibited from evaluating the body stream by not allowing the stub node of the body part from being expanded to the corresponding complete branch.

9. The method of claim 4, wherein the hierarchical data structure is read only in order to eliminate the need for locks on multiple concurrent running instances or threads of the hierarchical data structure.

10. The method of claim 4, wherein the complete branch of the hierarchical data structure is required to be dynamically generated, and wherein the navigator takes a lock on the hierarchical data structure during the generation of the branch in order to make the hierarchical data structure thread safe.

11. The method of claim 1, wherein the navigator is an XPath navigator, the application is an XPath engine, and the message is an XML document.

12. The method of claim 1, wherein the complete branch of the hierarchical data structure is required to be dynamically generated, and wherein the complete branch is cached for future use by other applications.

13. The method of claim 1, wherein the hierarchical data structure is a Document Object Model (DOM).

14. A computer program product that includes computer readable storage media having stored thereon computer executable instructions that, when executed by a processor, can cause the navigator to perform the method of claim 1.

15. A method as recited in claim 2, wherein:

the message is an XML document, the navigator is an XPath navigator, the application is an XPath inverse query engine that minimally accesses only a portion of a DOM to parse an input of the XML document and then discards the DOM, and the plurality of types of inputs includes a root, element, attribute, namespace, processing instruction, comment, or text;

the parser shields the application from conversion details for inputs;

and the method further includes:

not loading header blocks and body contents into the DOM until a first time the navigator descends into the header blocks and body contents, respectively, and loading only sub-portions of the header blocks and body contents.

\* \* \* \* \*